(12) United States Patent
Raybone et al.

(10) Patent No.: US 7,011,796 B2
(45) Date of Patent: Mar. 14, 2006

(54) PLASMA ASSISTED CATALYTIC TREATMENT OF GASES

(75) Inventors: David Raybone, Stow-on-the-Wold (GB); James Timothy Shawcross, Charlbury (GB)

(73) Assignee: Accentus plc, Didcot (GB)

( * ) Notice: Subject to any disclaimer, the term of this patent is extended or adjusted under 35 U.S.C. 154(b) by 508 days.

(21) Appl. No.: 10/239,583

(22) PCT Filed: Apr. 5, 2001

(86) PCT No.: PCT/GB01/01571

§ 371 (c)(1),
(2), (4) Date: Sep. 24, 2002

(87) PCT Pub. No.: WO01/76733

PCT Pub. Date: Oct. 18, 2001

(65) Prior Publication Data

US 2003/0066285 A1    Apr. 10, 2003

(30) Foreign Application Priority Data

Apr. 11, 2000  (GB) .................................. 0008815
Aug. 18, 2000  (GB) .................................. 0020429

(51) Int. Cl.
*B01J 19/08* (2006.01)
(52) U.S. Cl. .................... 422/186.04; 204/177; 60/275
(58) Field of Classification Search .......... 422/186.04; 204/164, 177; 60/275
See application file for complete search history.

(56) References Cited

U.S. PATENT DOCUMENTS

| | | | |
|---|---|---|---|
| 3,983,021 A | 9/1976 | Henis | 204/164 |
| 4,902,487 A | 2/1990 | Cooper | 423/215.5 |
| 5,147,516 A | 9/1992 | Mathur | 204/177 |
| 5,149,511 A | 9/1992 | Montreuil | 423/212 |
| 5,284,556 A | 2/1994 | Rich | 204/164 |
| 5,711,147 A | 1/1998 | Vogtlin | 60/274 |

FOREIGN PATENT DOCUMENTS

| | | |
|---|---|---|
| GB | 2270013 | 3/1994 |
| GB | 2274412 | 7/1994 |
| WO | 98/09699 | 3/1998 |
| WO | 99/12638 | 3/1999 |
| WO | 99/18494 | 4/2000 |
| WO | 00/50746 | 8/2000 |
| WO | 00/71866 | 11/2000 |

OTHER PUBLICATIONS

"Plasma-Assisted Catalytic Reduction of $NO_x$," the English translation of H.S. Lee, B.H. Chun, K.M. Chun, "Plasma-Assisted Catalytic Reduction of NOx," Proceedings of the KSME 1998 Fall Annual Meeting B, pp. 434-439.
1998 Pan-American Workshop On Commercialization of Advanced Oxidation Technologies, Abstracts & Speakers' Presentations, Sponsored by Science & Technology Network, London, Ontario, Canada, Jun. 27-30, 1998, Presentation by John Hoard, "Plasma-Catalysis for Lean NOx Remediation," pp. 110-115.

(Continued)

*Primary Examiner*—Kishor Mayekar
(74) *Attorney, Agent, or Firm*—William H. Holt

(57) ABSTRACT

A catalytic material for the plasma-assisted treatment of the exhaust gases from internal combustion engines, consisting of an activated alumina, which contains silver or molybdena ($MoO_3$). For silver doped alumina, a preferred silver concentration is between 0.1% and 5% by weight. The preparation and use of silver doped alumina material also is described.

10 Claims, 2 Drawing Sheets

OTHER PUBLICATIONS

Thomas Hammer and Stefan Broer, "Plasma Enhanced Selective Catalytic Reduction of $NO_x$ for Diesel Cars," SAE Paper 982428, 1998, pp. 7-12.

"De-$NO_x$ Technology Using Plasma/Catalyst Composite System," the English translation of H.S. Lee et al, "A Study on DeNOx Performance of Plasma/Catalyst System," KSAE Autumn Conference Proceedings 1999, Paper No. 99380169.

Christopher R. McLarnon and Bernie M. Penetrante, "Effect of Gas Composition on the $NO_x$ Conversion Chemistry in a Plasma," SAE Paper 982433, 1998, pp. 37-48.

B.M. Penetrante et al, "Plasma-Assisted Catalytic Reduction of $NO_x$," SAE Paper 982508, pp. 57-66.

Balmer et al, "Diesel $NO_x$ Reduction on Surfaces in Plasma," SAE Paper 982511, 1998, pp. 73-78.

Hammer et al, "Plasma Enhanced Selective Catalytic Reduction: Kinetics of $NO_x$-Removal and Byproduct Formation," SAE Paper 1999-01-3632, 1999, pp. 1-7.

Balmer et al. "$NO_x$ Destruction Behavior of Selected Materials When Coimbined with a Non-Thermal Plasma," Battelle Memorial Institute, 1999-01-3640, pp. 67-73.

Penetrante et al, "Sulfur Tolerance of Selective Partial Oxidation of NO to $NO_2$ in a Plasma," SAE 1999-01-3687, pp. 111-120.

"Non-Thermal Plasma Techniques for Pollution Control," pp. 1 and 7.

M. Shelef, "Selective Catalytic Reduction of $NO_x$ with N-Free Reductants," American Chemical Society, 1995, pp. 209-225.

Parvulescu et al, "Catalytic Removal of NO," Catalysis Today, vol. 46 (1998), pp. 233-316.

"Oxidation of NO to $NO_2$ on a Pt-MFI zeolite and subsequent reduction of $NO_x$ $C_2H_4$ on an In-MFI zeolite: a novel de-$NO_x$ strategy in excess oxygen," Chemical Communications, 1997, pp. 37-38.

Tatsuo Miyadera, "Alumina-supported silver catalysts for the selective reduction of nitric oxide with propene and oxygen-containing organic compounds," Applied Catalysis B: Environmental, vol. 2, 1993, pp. 199-205.

Tatsuo Miyadera et al, "Alumina-supported Catalysts for the Selective Reduction of Nitric Oxide by Propene," Chemistry Letters, 1993, pp. 1483-1486.

K. Masuda et al, "Silver-promoted catalyst for removal of nitrogen oxides from emission of diesel engines," Applied Catalysis B: Environmental, vol. 8 (1996), pp. 33-40.

K.A. Bethke et al, "Supported Ag Catalysts for the Lean Reduction of NO with $C_3H_6$," Journal of Catalysis, vol. 172 (1997), pp. 93-102.

T. Nakatsuji et al, "Catalytic reduction system of $NO_x$ in exhaust gases from diesel engines with secondary fuel injection," Applied Catalysis B: Environmental, vol. 17 (1998), pp. 333-345.

A. Keshavaraja et al, "Selective catalysis reduction of NO with methane over Ag-alumina catalysis," Applied Catalysis B: Environmental, vol. 27 (2000), pp. L1-L9.

F.C. Meunier et al, "Mechanistic Aspects of the Selective Reduction of NO by Propene over Alumina and Silver-Alumina Catalysts," Journal of Catalysis, vol. 187 (1999), pp. 493-505.

S.G. Masters et al, "Selective reduction of nitric oxide by methanol and dimethyl ether over promoted alumina catalysts in excess oxygen," Applied Catalysis B: Environmental, vol. 23 (1999), pp. 235-246.

"Stop-go systems get the green light," European Automotive Design, Apr. 1998, pp. 24-26.

Suzanne E. Thomas et al, Accentus pic, "The role of NO Selective Catalysts in the Plasma Enhanced Removal of $NO_x$ and PM from Diesel Exhausts," SAE 2001 01FL-341, 11 pages.

Barry J. Cooper and James E. Thoss, "Role of NO in Diesel Particulate Emission Control," SAE 890404, 1989, pp. 171-183.

H.S. Lee, B.H. Chun, K.M. Chun, "Plasma-Assisted Catalytic Reduction of NOx," Proceedings of the KSME 1998 Fall Annual Meeting B, pp. 434-439.

H.S. Lee et al, "A Study on DeNOx Performance of Plasma/Catalyst System," KSAE Autumn Conference Proceedings 1999, Paper No. 99380169.

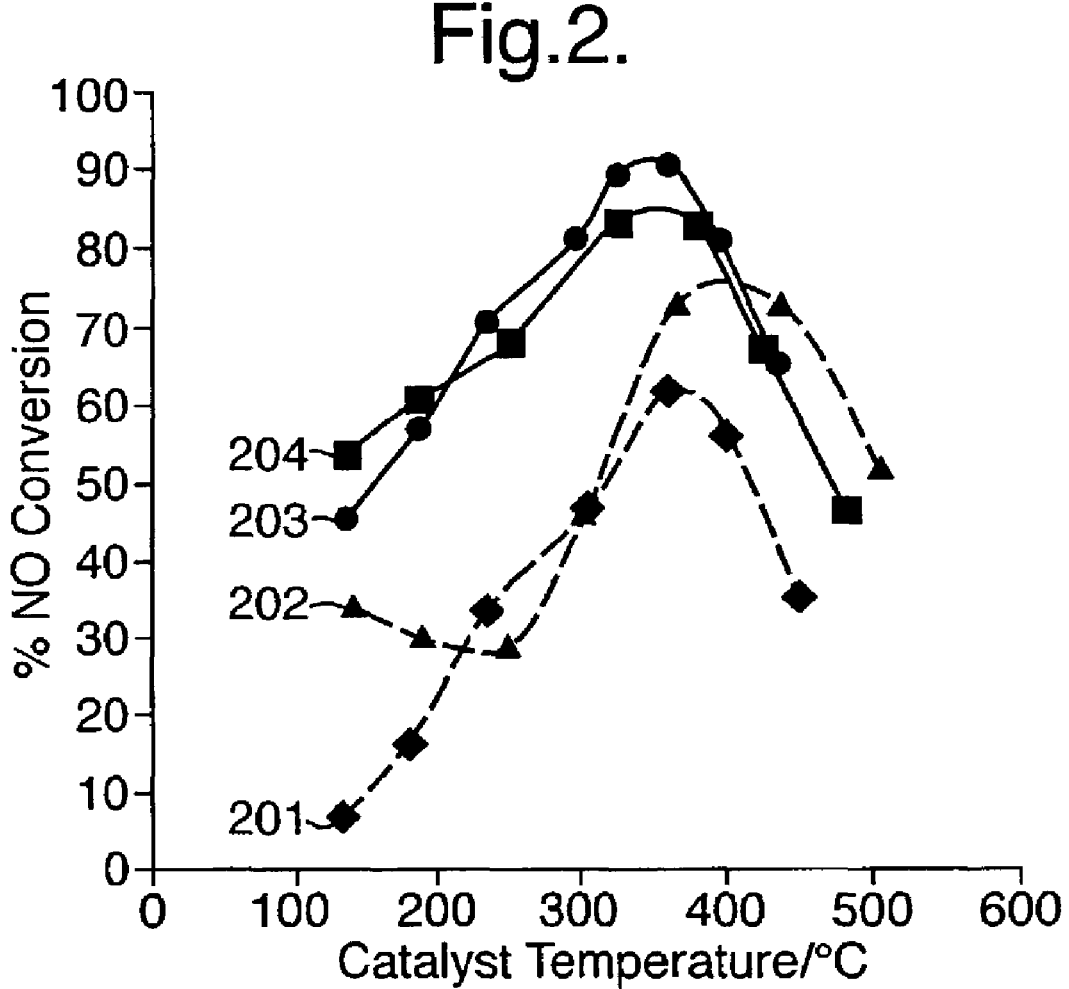

PLASMA ASSISTED CATALYTIC TREATMENT OF GASES

This application is a 371 National stage filing of PCT/GB01/01571 on Apr. 5, 2001.

The present invention relates to the plasma-assisted treatment of the exhaust gases from internal combustion engines to reduce the emission of nitrogen oxides.

BACKGROUND OF THE INVENTION

One of the major problems associated with the development and use of internal combustion engines is the noxious exhaust emissions from such engines. Two of the most deleterious materials, particularly in the case of diesel engines, are particulate matter (primarily carbon) and oxides of nitrogen such as nitric oxide NO and nitrogen dioxide $NO_2$ often referred to as ($NO_x$).

Excessive levels of $NO_x$ also are produced by spark-ignition engines operating in what is known as 'lean burn' mode in which the air/fuel (e.g. gasoline) ratio is higher than that required for stoichiometric combustion. It is also appreciated that alternative fuels and hybrid type combustion engines, as an example which may burn diesel fuel and/or natural gas, may also pose a similar problem. Increasingly severe emission control regulations are forcing internal combustion engine and vehicle manufacturers to find more efficient ways of removing these materials in particular from internal combustion engine exhaust emissions.

One of the ways in which emissions are being reduced is by modifying the combustion process in the engine. Modifications include altering injection timing, engine design, common rail systems and exhaust gas recycling but all have certain limits for practical engine operation. Unfortunately, in practice, it is often found that techniques which modify the combustion process to improve the situation in relation to one of the above components of internal combustion engine exhaust emissions can tend to worsen the situation in relation to the other.

There are numerous techniques being developed to remove $NO_x$ emissions from exhaust gases from internal combustion engine exhaust as well as other waste gas sources. In general, practical $NO_x$ reduction systems for internal combustion engines are reliant on passing the exhaust gases across a catalyst. There are generally two types of catalytic reduction methods used, non-selective and selective catalytic reduction (SCR). This invention is concerned primarily with SCR systems and requires a suitable reductant or reducing agent to be present or added to the exhaust gas. Typical reductants for this purpose are urea or ammonia, but these are not the most practical for mobile vehicle applications. This is because this needs additional space for the reductant tank on the vehicle and a supply infrastructure to allow the reductant to be replenished. SCR catalysts can however perform very effectively using hydrocarbons, normally found in the combustion engine exhaust, as the reductant for a certain range of temperatures. One of the key issues with this approach is whether the exhaust gas has the required concentration of hydrocarbon reductant present to promote the required selective catalytic reactions to reduce $NO_x$ to nitrogen. The concentration of hydrocarbons may be altered, if there is insufficient in the exhaust, by for example, adding a post-injection of fuel into the combustion chamber or by injecting fuel into the exhaust. One recently developed method is to use non-thermal plasma to activate the hydrocarbon, which may be in the form of additional fuel, to promote the catalytic $NO_x$ reduction to nitrogen as disclosed in WO99/12638.

Considerable effort has been dedicated to the development of catalysts for the reduction of $NO_x$ from diesel exhausts. The paper 'Selective Catalytic Reduction of $NO_x$ with N-Free Reductants' by M. Shelef published in Chem. Rev. 1995 pages 209–225 is a comprehensive review in particular of the use of zeolites for the reduction of the $NO_x$ content of internal combustion engine exhaust gases. Other catalysts are mentioned but not dealt with comprehensively. The more recent review by Parvulescu et al 'Catalytic Removal of NO' published in Catalysis Today, volume 46 (1998) pp 233–316 is a comprehensive document on the range of materials that have been evaluated for the selective catalytic reduction of $NO_x$. This is $NO_x$ reduction using catalysts such as zeolites, including metal exchanged zeolites, oxides such as simple oxides, for example $Al_2O_3$, $V_2O_5$, complex oxides, such as perovskites, and precious metal supported oxides, in the presence of reducing agents such as hydrocarbons or ammonia. All of the materials described in this review are used solely as thermally active catalysts.

U.S. Pat. No. 5,149,511 discloses a system for reducing $NO_x$ emissions from oxygen-rich internal combustion engine exhaust gases in which partially oxygenated light organic compounds such as alcohols, aldehydes, ketones and ethers, are injected into the exhaust gases which are then passed over a bed of a copper-containing ZSM5 zeolite and then a bed of an oxidising catalyst such as Pt doped alumina or 1% Pd/10% $La_2O_3/Al_2O_3$ to remove any unreacted reductant.

Despite extensive world-wide efforts it has been difficult to find an effective catalyst for selective catalytic reduction of $NO_x$ because candidate materials can be deactivated in use, for example by water vapour at typical diesel exhaust temperatures. The selectivity of the catalyst is difficult to control, as the optimum operating temperature of the catalyst does not always coincide with the exhaust gas temperature. In practice, the catalyst may not be wholly selective to $NO_x$, for example it may oxidise hydrocarbon present in the exhaust gases at the expense of the selective catalytic reduction of $NO_x$ to $N_2$. There is also considerable concern that the current selectivity of SCR catalysts operating in lean engine exhausts (Lean-$NO_x$ catalysts) is poor. This means that undesirable species such as $N_2O$ are formed, which has a very strong greenhouse gas effect, instead of nitrogen ($N_2$). Other selectivity problems include an apparent reduction of, for example $NO_2$ concentration which is actually an interconversion back to NO, not a reduction to $N_2$. A considerable number of catalysts are also reported to be reliant upon the $NO_x$ emissions to be predominantly $NO_2$ for reduction to $N_2$.

Multi-stage systems for the selective catalytic reduction of $NO_x$ have also been developed: U.S. Pat. No. 4,902,487 and the article by Cooper and Thoss 'Role of NO in Diesel Particulate Emission Control' published as SAE 890404, 1989 describe a two-stage system in which diesel exhaust is passed over a Platinum (Pt) oxidation catalyst, which oxidises NO in the exhaust gas. to $NO_2$ after which $NO_2$ reacts with carbonaceous particulates in the exhaust stream that are trapped on a filter. The $NO_2$ effectively combusts the deposited carbon particulates and is thus reduced and products of this reaction are NO, $N_2$, CO and $CO_2$. A combustion catalyst for example lanthanum, caesium and vanadium pentoxide on the filter is used to lower the combustion temperature of the carbon/$NO_2$ reaction to around 538 Kelvin.

Iwamato et al in the article 'Oxidation of NO to $NO_2$ on a Pt-MFI Zeolite and Subsequent Reduction of $NO_x$ by $C_2H_4$ on an In-MFI zeolite: a novel de-$NO_x$ strategy in excess oxygen' published in Chemical Communications pages 37–38, 1997, describe the use of a two-stage system whereby NO is first oxidised to $NO_2$ by a Pt-containing MFI zeolite oxidation catalyst with maximum conversion at 423 K. Hydrocarbon, $C_2H_4$, is added to the oxidised gas stream which is passed over an In-containing MFI zeolite catalyst, whereupon the selective catalytic reduction of $NO_2$ to $N_2$ takes place in the presence of excess oxygen. PCT application WO98/09699 discloses an arrangement in which oxygen-rich exhaust gases are passed through a bed of an oxidising catalyst such as platinum-doped alumina in which $NO_x$ in the exhaust gases is oxidised to $NO_2$. Hydrocarbons are mixed with the effluent from the oxidiser and the mixture is passed through a bed of a reducing catalyst, γ-alumina in which the $NO_2$ and hydrocarbons are reduced to $N_2$, $CO_2$ and $H_2O$.

Multi-stage systems using a combination of a non-thermal plasma and a catalyst for the treatment of $NO_x$ components of diesel exhausts have been proposed.

GB Patent Application 2,270,013 A describes a two-stage system in which exhaust emissions from internal combustion engines are subject to a low temperature plasma and then passed over a catalyst that is downstream of the plasma. Although not specifically mentioned in GB 2,270,013 A it will be appreciated that the exhaust emissions can contain nitrogen oxides.

U.S. Pat. No. 5,711,147 describes a two-stage system in which a non-thermal plasma oxidises NO in a gas stream to $NO_2$ and the latter then undergoes selective catalytic reduction to $N_2$ in the presence of $C_3H_6$ over a γ-$Al_2O_3$ catalyst. The system is for use with oxygen-rich exhaust gases from diesel and lean-burn spark ignition engines. In the system described in U.S. Pat. No. 5,711,147 a hydrocarbon such as diesel fuel is cracked into simpler hydrocarbons by a corona discharge and then is mixed with the oxygen-rich exhaust gases from which $NO_x$ is to be removed. The mixed hydrocarbons and exhaust gases are then passed through another region of corona discharge, which may include silica beads as a particulate trap. In this region, $NO_x$ is oxidised to $NO_2$. The $NO_2$ plus excess hydrocarbons are passed through a bed of a catalyst which acts to reduce the $NO_2$ to $O_2$ and $N_2$ and to oxidise the hydrocarbons to $CO_2$ and $H_2O$. No plasma is involved in the reduction stage. There is a requirement for the pre-conversion of NO to $NO_2$ before selective catalytic reduction in U.S. Pat. No. 5,711,147 as the catalyst used is more efficient for the reduction of $NO_2$ reduction than for the reduction of NO. In addition sufficient hydrocarbons have to be present to enhance the plasma oxidation of NO to $NO_2$ and to act as a reductant for reduction of $NO_2$ to $N_2$.

WO00/18494 describes a method and apparatus in which a gas stream containing NO and hydrocarbon is passed through a plasma and then over a catalyst comprising a microporous material, particularly a zeolite, resulting in the reduction of Nox to nitrogen. Results shown in WO00/18494 indicate that the percentage $NO_x$ reduction was as high as 77%, but it could be as low as 4% depending on the catalyst used for temperatures in the range 373–573 K.

GB patent 2,274,412 discloses a method and apparatus for removing particulate and other pollutants from internal combustion engine exhaust gases. In addition to removing particulates by electric discharge assisted oxidation such as by use of a non-thermal plasma, there is disclosed the reduction of $NO_x$ gases to nitrogen, by the use of a bed of pellets adapted to catalyse the $NO_x$ reduction.

Also, U.S. Pat. Nos. 3,983,021, 5,147,516 and 5,284,556 disclose the catalytic reduction of nitrogen oxides. However, U.S. Pat. No. 3,983,021 is solely concerned with the reduction of NO to N in a silent glow discharge, the temperature of which is kept below a value at which the oxidation of N or NO to higher oxides of nitrogen does not occur.

Although, so-called contact bodies are used in the process of U.S. Pat. No. 3,983,021, and some of those disclosed may have some catalytic properties, catalysis does not appear to be a necessary feature of the process of U.S. Pat. No. 3,983,021. Other surface properties, such as adsorption on large surface area materials, are the basis of the process of U.S. Pat. No. 3,983,021.

U.S. Pat. No. 5,147,516 does refer to the use of catalysts to remove $NO_x$, but the catalytic materials involved are defined as deriving their catalytic activity from their form rather than their surface properties.

Also, the operating conditions are very tightly defined. There is no specific mention of the type, if any, of electric discharge involved. All that is disclosed is that the $NO_x$ removal depends upon electron-molecule interactions, facilitated by the structure of the 'corona-catalytic' materials.

PCT specification WO99/12638 describes a method for the treatment of internal combustion exhaust gases in which nitrogen oxides are removed by a process which includes the operations of passing hydrocarbons through a plasma in which there is a first material having oxidative properties in the presence of a plasma thereby to produce plasma activated hydrocarbons and contacting a mixture of the activated hydrocarbons and the exhaust gases with a second material adapted in the presence of the activated hydrocarbons to catalyse the reduction of the nitrogen oxides to nitrogen.

Among the materials for carrying out the second step of the invention disclosed in WO99/12638 are various forms of alumina including activated alumina. Activated aluminas include the γ-alumina phase. Such materials also are disclosed in many of the other examples of prior art mentioned above.

It has been found that, in practice, γ-aluminas in particular have the disadvantage that their reactivities are sensitive to the presence of water and as internal combustion engine exhaust gases include amounts of water vapour which vary with the operating conditions of the engine concerned, the performances of the catalysts are variable.

Silver-based catalysts have been described for the reduction of $NO_x$ in vehicle emissions. In the papers by Miyadera "Alumina-supported silver catalysts for the selective reduction of nitric oxide with propene and oxygen-containing organic compounds" published in Applied Catalysis B: Environmental, volume 2, (1993) pages 199–205, and Miyadera and Yoshida "Alumina-supported silver catalysts for the selective reduction of nitric oxide with propene" published in Chemistry Letters, (1993), page 1483 a 2% Ag-alumina catalyst showed promising hydrothermal stability for $NO_x$ reduction. Added propene and partially oxygenated hydrocarbons, such as 2-propanol, were effective reductants. Masuda et al in the article "Silver promoted catalyst for removal of nitrogen oxides from emissions of diesel engines" in Applied Catalysis B: Environmental, volume 8, (1996), pages 33–40 showed that 3% Ag-mordenite was a promising lean $NO_x$ catalyst compared to Ag-ZSM-5 and Ag-alumina with $CH_3COCH_3$ as reductant. Bethke and Kung in the paper "Supported Ag catalysts for the lean reduction of NO with $C_3H_6$" published in Journal of Catalysis, volume 172, (1997), page 93 showed that the oxidation state of silver affects its catalytic activity for the reduction of $NO_x$. Another silver containing compound, silver aluminate, $AgAl_2O_4$, doped with 0.1 weight % $WO_3$ was shown to be a promising catalyst for the reduction of $NO_x$ by Nakatsuji et al in the paper "Catalytic reduction system of $NO_x$ in exhaust gases from diesel engines with secondary fuel injection" published in Applied Catalysis B: Environmental, volume 17, (1998), pages 333–345. Keshavaraja et al in an article 'Selective catalytic reduction of NO with methane over Ag-alumina catalysts' published in Applied Catalysis B:Environmental, volume 27, pages L1–L9, 2000 used $CH_4$ for the selective reduction of NO over silver-alumina catalysts at temperatures between 723–923 K with Ag loadings of 1–7 weight percent.

Meunier et al have discussed the role of silver-alumina catalysts on the selective catalytic reduction of NO by propene in an article 'Mechanistic aspects of the selective reduction of NO by propene over γ-alumina and silver-alumina catalysts' published in Journal of Catalysis, volume 187, pages 493–505, 1999. High silver loadings, 10 percent by weight produced $N_2O$ while a low loading, 1.2 percent by weight,.was effective for the selective catalytic reduction of NO to $N_2$. Adsorbed organo-nitrogen compounds such as organo-nitrites were intermediate species in the reaction.

Masters and Chadwick showed that oxygenated hydrocarbons, methanol and dimethyl ether can reduce NO to $N_2$ under lean conditions by selective catalytic reduction over γ-alumina. This work, 'Selective reduction of nitric oxide by methanol and dimethyl ether over promoted alumina catalysts in excess oxygen', published in Applied Catalysis B: Environmental, volume 23, pages 235–246, 1999 showed that molybdena ($MoO_3$) additions improved the catalytic activity at temperatures lower than those required in the case of γ-$Al_2O_3$ alone. Surface formyl species were an intermediate product in the reaction.

However, the above published work on silver-, or molybdena ($MoO_3$)—, containing catalysts has been carried out in circumstances which have not involved the use of non-thermal plasmas. Silver-, or molybdena ($MoO_3$), containing alumina based catalytic materials have not been proposed for use in the plasma assisted catalytic treatment or internal combustion engine exhaust emissions, The operation of catalytic materials in a plasma-assisted process environment is often different to that with operation in the absence of plasma, and is not straightforwardly predictable. Not only does direct exposure to the plasma affect catalytic performance in a number of ways, but also species formed in the plasma of a plasma-assisted process can affect the activity of catalytic materials whether or not the catalytic material is subjected directly to the plasma. The plasma can also enhance or even promote a catalytic effect on materials which are either slightly catalytic or show no catalytic behaviour at all.

BRIEF SUMMARY OF THE INVENTION

It is an object of the present invention to provide an improved activated alumina catalyst material for use in the plasma-assisted treatment of the exhaust gases from an internal combustion engine which has better hydrothermal stability, a wider operating temperature range and a reduced requirement for the pre-conversion of NO to $NO_2$ than those used hitherto.

According to the invention there is provided a method for the plasma-assisted processing of the exhaust gases from internal combustion engines to reduce the emission of nitrogen oxides therefrom, including the operations of producing a non-thermal plasma in the exhaust gases and passing the excited exhaust gases through a gas-permeable body of an activated alumina containing silver or molybdena ($MoO_3$) at a concentration sufficient for promoting catalytic reduction of nitrogen oxides to $N_2$, but low enough to avoid production of unwanted species such as $N_2O$.

Preferably the body of activated alumina contains silver at a concentration between 0.1 and 5 per cent by weight, preferably about 2 per cent by weight.

Preferably the activated alumina consists of at least primarily γ-$Al_2O_3$ and the proportion of silver is in the region of 2% by weight.

Other crystalline phases of alumina can be used instead of or as well as γ-alumina. Other dopants, including metallic and metal oxide additions to the alumina can be used in combination with the silver or molybdena ($MoO_3$) doped alumina.

In accordance with the present invention a method of manufacturing a catalytic material for use in the aforesaid method includes subjecting a silver-containing body of activated alumina to a hydrothermal treatment process.

A suitable loading of silver is approximately 2% by weight and an example of a suitable hydrothermal treatment process is to heat the silver-containing alumina to a temperature in the range of 723–823 K in an atmosphere of air with a relative humidity in the range 3–10%, for a period of twenty four hours or more. It is appreciated that there are many other permutations in which this process may be performed.

Also according to the present invention there is provided a reactor for the plasma-assisted processing of the exhaust gases from internal combustion engines to reduce the emission of nitrogen oxides therefrom, comprising a reactor chamber adapted to be incorporated into the exhaust system of an internal combustion engine, means for generating a non-thermal plasma in hydrocarbon-containing exhaust gases passing through the reactor chamber and means for constraining the exhaust-gases to pass through a gas-permeable body comprising an activated alumina containing silver or molybdena ($MoO_3$) at a concentration sufficient for promoting catalytic reduction of nitrogen oxides to $N_2$, but low enough to avoid production of unwanted species such as $N_2O$.

Preferably the body of activated alumina contains silver at a concentration between 0.1 and 5 per cent by weight, preferably about 2 per cent by weight.

The silver-, or molybdena ($MoO_3$)—, alumina catalyst may be situated in the region of the reactor where the plasma is generated or in a separate plasma reactor downstream of the aforementioned plasma reactor. It may also be positioned downstream of a plasma reactor, itself not in a plasma region.

BRIEF DESCRIPTION OF THE DRAWINGS

The invention will now be described by way of example and with reference to the accompanying drawings, in which:

FIG. 2 is a graph for demonstrating the combined effect of plasma and silver-, or molybdena ($MoO_3$)—, alumina catalyst on conversion of NO to $N_2$ in a simulated diesel exhaust stream.

DETAILED DESCRIPTION OF THE INVENTION

Figure 1:
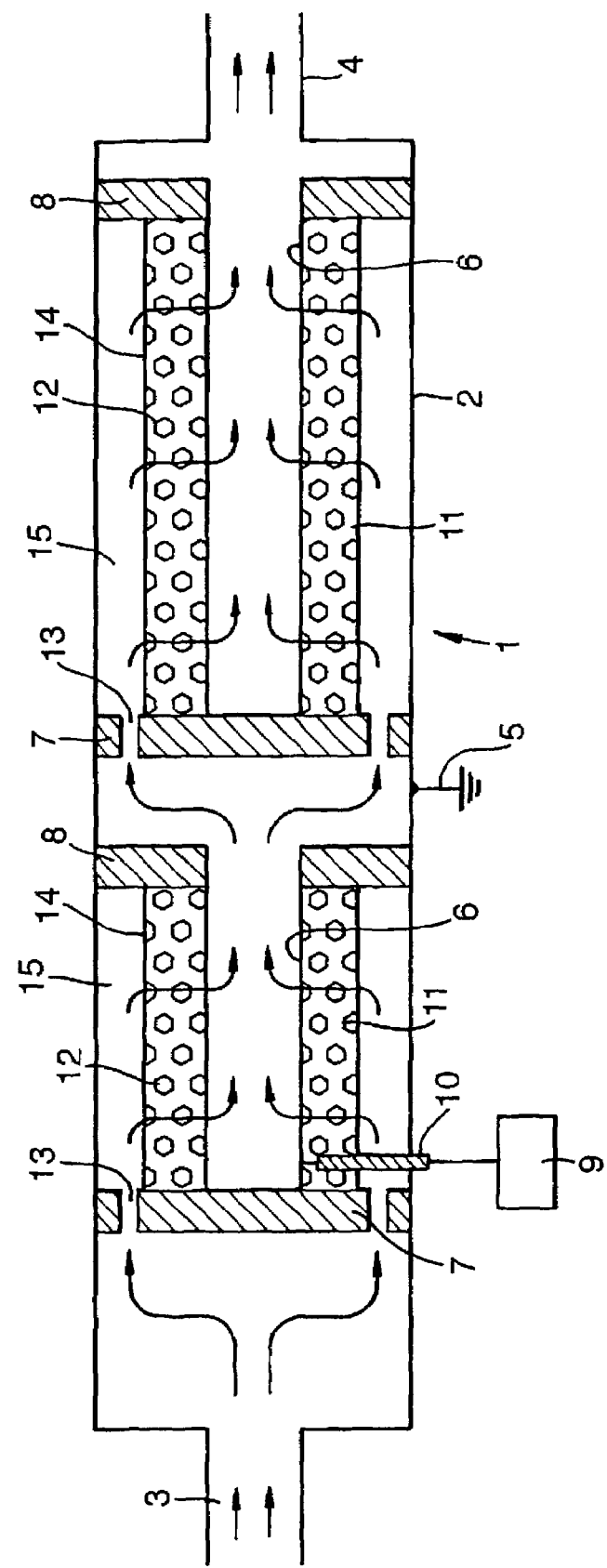
FIG. 1 is a longitudinal section of a schematic reactor system embodying the invention for the removal of nitrogen oxides from the exhaust gases from an internal combustion engine.

Referring to FIG. 1, a reactor 1 for removing nitrogen oxides and particulate carbonaceous combustion products from the exhaust gases from an internal combustion engine consists of a cylindrical stainless steel chamber 2 which has an inlet stub 3 and an outlet stub 4 by means of which it can be incorporated into the exhaust system of an internal combustion engine (not shown in the drawing). The chamber 2 is arranged, in use, to be connected to an earthing point 5. Inside the chamber 2 there is a plasma activation reactor including perforated stainless steel inner and outer electrodes 6 and 14, respectively positioned co-axially within the chamber 2 by means of two electrically insulating supports 7 and 8. The supports 7 and 8 can be made of a ceramic material such as alumina or that known by the name MICATHERM (Registered Trade Mark). The space 11 bounded by the electrodes 6 and 14 and the supports 7 and 8 is filled by a gas-permeable bed 12 of an active dielectric material or mixtures of materials which may assist in the removal of nitrogen oxides, such as mixed metal oxide materials.

The bed 12 of dielectric material is illustrated only highly diagrammatically. In practice the material forming the bed 12 can be in the form of spheres, irregular pellets, extrudates, fibres, sheets, wafers, a honeycomb monolith or any other convenient form.

A number of axially oriented holes 13 around the periphery of the support 7 and a central hole 16 in the support 8, together with the annular space 15 between the outer electrode 14 and the chamber 2 constrain the exhaust gases to flow radially through the bed 12 of dielectric material, as shown. Other configurations, including axial flow configurations can be adapted, if so desired, as can other forms of plasma generator such as a dielectric barrier reactor and pulsed corona discharge reactor.

A second reactor similar to the first reactor except there is no provision for applying a high potential to it, in this example, is incorporated in the chamber 2 downstream of the first, plasma excitation, reactor. Those components of the second reactor which correspond to the equivalent components in the first reactor have the same reference numerals. In the second reactor, the gas-permeable bed 12 is made of a silver-, or molybdena ($MoO_3$)—, doped activated alumina incorporating γ-alumina. Suitable forms of alumina are those known by the trade names CT530 (marketed by Catal International, Sheffield, UK) or Alumina C (marketed by Degussa Corp. USA). As before, the material forming the bed 12 of the second reactor can be in the form of spheres, irregular pellets, extrudates, fibres, sheets, wafers of a honeycomb monolith or any other convenient form which has a high surface area and provides a ready passage for the exhaust gases. It should be appreciated that there may be a requirement to provide a means for adding additional reductant such as fuel or hydrocarbon into the plasma region and/or catalyst in a one or two stage system.

A high tension power supply 9 is connected to the inner electrode 6 via an insulated lead-through 10. A convenient power supply 9 is one adapted to provide a potential of the order of kilovolts to tens of kilovolts and repetition frequencies in the range of 50–5000 Hz, although higher frequencies of the order of tens of kilohertz can be used. Pulsed direct current is convenient for automotive use, but alternating potentials for example triangular or sine waves of the same or similar characteristics can be used. This normally is sufficient to excite the exhaust gases into a non-thermal plasma within the interstices of the bed 12 of active material. The power supply 9 may incorporate an integrated starter alternator damper system (ISAD) such as is described in an article 'Stop/go Systems Get the Green Light' European Automotive Design April 1998. An ISAD can be used as part of a power supply system to power a plasma assisted emissions control system of which a plasma reactor is part.

In addition, other power sources such as but not limited to single/multiple output 12/14V alternator technologies e.g. 14V/42V, fuel cells, gas turbines, solar cells and heat exchangers can be the primary or part-provider of the electrical-generating power source that can also be used to power the power supply system for the reactor.

In one example, the bed 12 of catalytic material in the second reactor in the reactor chamber 2 consists of γ-alumina incorporating 2 percent by weight of silver. The material is in the form of high porosity spheres and is prepared by mixing sufficient of a soluble silver salt for example silver nitrate to provide the required weight per cent of silver in an amount of alumina with a volume of water equivalent to the estimated pore volume of the amount of alumina concerned. The silver solution is contacted with the alumina until all the solution is absorbed. This method of matching the volume of solution to the pore volume of alumina is known as incipient wetness. The saturated alumina is then dried at 353 K in air and then heated initially in air at 823 K for 3 hours after which the silver containing alumina is subjected to a hydrothermal treatment by heating to a temperature of between 723 K to 823 K in air with a relative humidity of between 3 and 10% for a period of twenty four hours. Silver concentrations in the range 0.1 to 5 per cent by weight can be employed. Before impregnation with silver salt solution the alumina can also be treated to enhance its surface acidity for example by impregnation with a mineral acid such as hydrochloric acid by incipient wetness, followed by drying and heating at a high temperature around 873 K.

It will be apparent to those skilled in the art that there are a number of other methods which can be used for the initial preparation of similar composition silver alumina catalysts. Silver on alumina powders can be prepared by a variety of wet chemical techniques including sol-gel processing with metal alkoxides in which hydrolysis and/or precipitation is used, use of aqueous alumina colloidal dispersions and by use of emulsions and microemulsions. Impregnation and incipient wetness techniques can be used for doped alumina powders. Alumina powders can be prepared by precipitation from sol-gel precursors and impregnated with silver salts. The crystallite size of the silver particles can be controlled through the precipitation and/or hydrolysis process. Silver on alumina coatings can also be prepared by wet chemical techniques. The coating of silver is also not restricted to alumina and examples such as silver zeolites may be of use.

Silver concentrations in the above range are found to produce doped-alumina materials which are more hydrothermally stable than un-doped activated aluminas. The silver doping also promotes the reducing activity of the catalyst with respect to activated hydrocarbon reductant species, including organo-nitrogen containing reductant species produced in the plasma in the bed of gas permeable material in the first reactor in the chamber 2. Sufficient unburnt hydrocarbons may be present in the exhaust gases, but if so desired, hydrocarbons such as those derived from the fuel, or other suitable reductants, can be added to the exhaust gases either prior to their admission to the reactor or during their passage through the plasma region of the reactor. It is a significant feature of this invention that it is not a necessary requirement that NO in the exhaust has to be converted to $NO_2$ before contacting the silver-containing alumina, as the catalyst is active for reduction of NO and $NO_2$ in the presence of a reductant such as hydrocarbons or activated hydrocarbon species that may be produced by the plasma.

Other forms of plasma generator such as a dielectric barrier type can be used are described in our co-pending application PCT/GB00/01881 (GB 99 11728.5). Such plasma generator reactors can be used either separately, replacing the first reactor in the reactor chamber 2 in the drawing, or they can be incorporated into it instead of the plasma generator reactor therein described above. The position of the catalyst, inside or outside the plasma constitutes a one-stage or two-stage reactor respectively.

Other configurations including axial flow configurations can be adapted if desired as can other forms of non-thermal plasma generator such as pulsed corona discharge reactors, surface discharge reactor, dielectric and/or ferroelectric pellet bed reactor.

As an example Tables 1 and 2 show experimental results achieved when the exhaust gases at 423 K and 723 K, respectively from a diesel engine were passed through a two-stage reactor such as described above. This two-stage reactor has a plasma activation stage followed by a catalyst material. The tables illustrate the effect on the exhaust gases of the plasma on its own, the plasma combined with $Ag-Al_2O_3$ catalyst in a 2-stage system and the catalyst alone.

TABLE 1

(All measurements in ppm)

|  | At engine | Plasma stage Operative | Plasma/ Catalyst | Catalyst Only |
|---|---|---|---|---|
| $NO_x$ | 524 | 480 | 383 | 442 |
| NO | 507 | 305 | 309 | 407 |
| $NO_2$ | 17 | 175 | 74 | 35 |

TABLE 2

|  | At engine | Plasma stage Operative | Plasma/ Catalyst | Catalyst Only |
|---|---|---|---|---|
| $NO_x$ | 524 | 480 | 158 | 188 |
| NO | 507 | 305 | 118 | 140 |
| $NO_2$ | 17 | 175 | 42 | 48 |

It can be seen that some conversion of NO to $NO_2$ occurs during the plasma activation stage, but in each case, the combination of plasma and catalytic processing results in a greater total $NO_x$ reduction than is achieved with either plasma processing or silver-doped catalytic processing alone.

For example, at 423 K the catalyst alone achieves a total $NO_x$ reduction of 16% whereas the combined plasma and catalytic processing achieved a reduction of 27%. At 723 K the respective figures are 64% and 70%.

FIG. 2 further illustrates the beneficial effect on % NO conversion to nitrogen of using the plasma and silver alumina catalysts over a range of catalyst temperatures in a simulated diesel exhaust stream. The Figure illustrates the effect of using propene or fuel as a reductant in the exhaust. The effect on percentage NO conversion to nitrogen of the catalyst in the absence of plasma with fuel as reductant is shown at (201) and with propene as reductant is shown at (202). In addition the Figure shows the effect on % NO conversion to nitrogen of the combined plasma and catalyst with fuel as reductant (204) and propene as reductant (203). It can be seen that the combination of plasma and catalytic processing results in a greater total NO reduction than is achieved with either plasma processing or silver-doped catalytic processing alone. For example, at 200° C. (473 K) the catalyst alone with fuel reductant achieves a total NO reduction to nitrogen of ~15% whereas the combined plasma and catalytic processing achieved a reduction of 60%.

The embodiments of reactor described herein may include further catalytic components, or be installed as part of an emissions control system employing catalysts or other emission control devices for the plasma assisted treatment of the exhaust gases from internal combustion engines. For example there may be a requirement to use an oxidation catalyst to remove unreacted hydrocarbons/fuel which have been used to promote the catalytic reduction required over the catalyst.

Such other emission control devices may comprise exhaust gas recirculation (EGR), variations in ignition timing, fuel injection timing and fuel injection pulse rate shaping. An example of the means of plasma generation is shown in PCT/GB00/00603.

The invention claimed is:

1. A method for plasma-assisted processing of exhaust gases from an internal combustion engine for reducing emission of nitrogen oxides therefrom, characterised by the steps of producing a non-thermal plasma in the exhaust gases and passing excited exhaust gases through a gas-permeable body of an activated alumina containing silver or molybdena ($MoO_3$) at a concentration sufficient for promoting catalytic reduction of nitrogen oxides to $N_2$, but low enough to avoid production of unwanted species such as $N_2O$.

2. A method according to claim 1, wherein the activated alumina is at least primarily γ-alumina containing between 0.1 and 5 per cent by weight of silver.

3. A method according to claim 1, wherein the gas permeable body of activated alumina includes approximately 2% by weight of silver.

4. A method according to claim 1, wherein said body of activated alumina containing silver has been subjected to a hydrothermal treatment.

5. A method according to claim 4, wherein the hydrothermal treatment comprises heating the silver-containing body of activated alumina to a temperature in the range 723 to 823 Kelvin in an atmosphere of air with a relative humidity in the range 3–10 per cent for a period of twenty four hours.

6. A reactor for plasma-assisted processing of exhaust gases from internal combustion engines for reducing emission of nitrogen oxides therefrom, comprising a reactor chamber for incorporation into an exhaust system of an internal combustion engine, means for generating a non-thermal plasma in hydrocarbon-containing exhaust gases passing through the reactor chamber and conduits for constraining the exhaust gases to pass through a gas-permeable body of a material which is active in the presence of excited hydrocarbons in the exhaust gases to catalyze reduction of nitrogen oxides to nitrogen, wherein the gas permeable material comprises an activated alumina containing silver or molybdena ($MoO_3$) at a concentration sufficient for promoting catalytic reduction of nitrogen oxides to $N_2$, but low enough to avoid production of unwanted species such as $N_2O$.

7. A reactor according to claim 6, wherein the means for generating a non-thermal plasma in the exhaust gases is separate from an upstream of the gas permeable body of the catalytic material.

8. A reactor according to claim 6, wherein the catalytic material comprises an activated alumina containing between 0.1% and 5% by weight of silver.

9. A reactor according to claim 7, wherein the catalytic material comprises an activated alumina containing between 0.1% and 5% by weight of silver.

10. A reactor according to claim 9, wherein the activated alumina comprises γ-alumina containing approximately 2% by weight of silver.

* * * * *